(12) United States Patent
Kutscha et al.

(10) Patent No.: US 12,299,865 B2
(45) Date of Patent: May 13, 2025

(54) METHOD AND APPARATUS FOR INSPECTING A COMPOSITE ASSEMBLY

(71) Applicant: The Boeing Company, Chicago, IL (US)

(72) Inventors: Eileen O. Kutscha, Seattle, WA (US); Garth T. Irvine, Winnipeg (CA); Richard Mark Shead, La Salle (CA)

(73) Assignee: The Boeing Company, Arlington, VA (US)

( * ) Notice: Subject to any disclaimer, the term of this patent is extended or adjusted under 35 U.S.C. 154(b) by 470 days.

(21) Appl. No.: 17/714,648

(22) Filed: Apr. 6, 2022

(65) Prior Publication Data

US 2023/0326004 A1 Oct. 12, 2023

(51) Int. Cl.
*G06T 7/00* (2017.01)
*G06V 10/75* (2022.01)
*G06V 10/764* (2022.01)
*G08B 21/18* (2006.01)

(52) U.S. Cl.
CPC .......... *G06T 7/0004* (2013.01); *G06V 10/757* (2022.01); *G06V 10/764* (2022.01); *G08B 21/182* (2013.01); *G06T 2207/30164* (2013.01)

(58) Field of Classification Search
CPC ........ G06T 7/0004; G06T 2207/30164; G06V 10/757; G06V 10/764; G08B 21/182; G01N 33/442
See application file for complete search history.

(56) References Cited

U.S. PATENT DOCUMENTS

2010/0065760 A1 * 3/2010 Lengsfeld ............... G01N 33/44
250/492.1

FOREIGN PATENT DOCUMENTS

CN 107003251 A * 8/2017 ............. G01B 11/30
WO WO-2023287591 A1 * 1/2023 ........... G06T 7/0004

* cited by examiner

*Primary Examiner* — Xiao Liu
(74) *Attorney, Agent, or Firm* — Harrity & Harrity, LLP

(57) ABSTRACT

A method of inspecting a composite assembly that includes a core coated with resin. Inspecting the composite assembly includes accessing an image of a cross section of the core, the image having a dot matrix data structure with a matrix of intensity values and identifying a subset of the intensity values that describe a distribution of the resin on the core. Next, the intensity values of the subset of the intensity values are classified to indicate either uniform or non-uniform distribution of the resin on the core. Either a first comparison determining a ratio of uniform resin or a second comparison determining a ratio of non-uniform resin is performed. Based on the first comparison or the second comparison as performed, a quality of the composite assembly is determined. Finally, an indication of the quality of the composite assembly is output.

20 Claims, 10 Drawing Sheets

RAW IMAGE

THRESHOLD 0-50
SHADOWS - 6% OF IMAGE

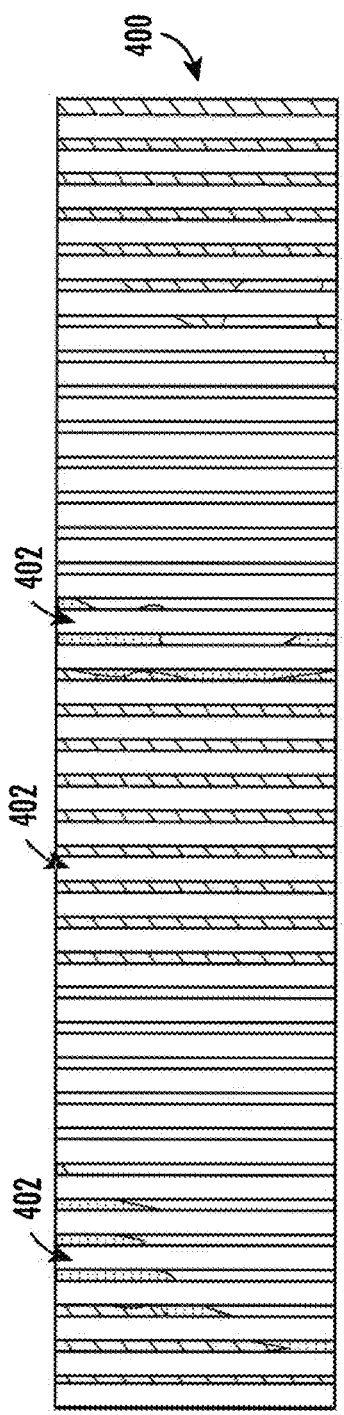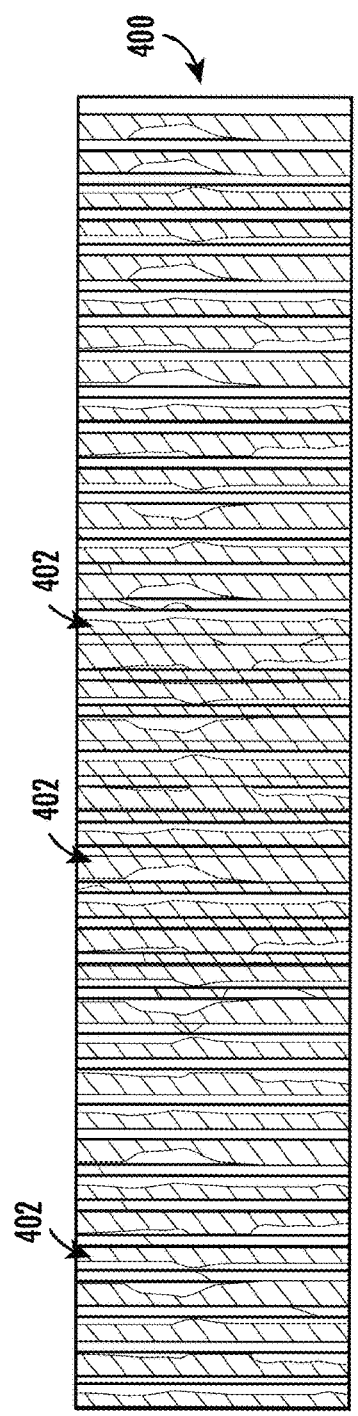
FIG. 4C — THRESHOLD 50-65 NON-UNIFORM RESIN - 5% OF IMAGE
FIG. 4D — THRESHOLD 65-145 UNIFORM RESIN - 61% OF IMAGE

METHOD AND APPARATUS FOR INSPECTING A COMPOSITE ASSEMBLY

TECHNOLOGICAL FIELD

The present disclosure relates generally to inspecting parts of a vehicle and, in particular, to inspecting composite assemblies for defects in their resin coated cores.

BACKGROUND

Non-metallic honeycomb cores are used in aerospace parts and assemblies (as well as other industries) as a low density, lightweight alternative to homogenous filler material. Parts include wing edges, door panels and interior non-structural panels. The parts generally include a honeycomb core panel with two face sheets on one or both sides.

The honeycomb core structure is bonded together and soaked in resin. The structural integrity of the bonds can be important for performance of the aerospace assembly having a honeycomb core, and bond integrity can be verified using non-destructive inspection (NDI) techniques. In some cases, the resin on the honeycomb core cell walls can be non-uniform. This non-uniformity of the phenolic resin on the cells can interfere with the NDI methods used to inspect the honeycomb core. The non-uniformity of the resin can cause issues with the NDI techniques, including weakening ultrasound signals used in the NDI process. If the ultrasound signal becomes too weak, the part cannot be properly inspected.

It would therefore be desirable to have a system and method that takes into account at least some of the issues discussed above, as well as other possible issues.

BRIEF SUMMARY

Example implementations of the present disclosure are directed to methods and apparatus for inspecting a composite assembly that includes a core coated with resin. The presently disclosed method includes analyzing an image of a cross section of a core of the composite assembly. The image has a dot matrix data structure with a matrix of intensity values. Of the intensity values, a subset is identified that indicates a distribution of the resin on the core. The identified subset of the intensity values are then classified as either uniform or non-uniform based on the magnitude of their intensity. The intensity values indicating uniform resin have a different intensity value magnitude than the intensity values indicating non-uniform resin. Once the intensity values of the subset are classified, a comparison is performed to determine a first ratio of uniform resin to non-uniform resin or a second ratio of non-uniform resin to uniform resin. From the first or second ratio, a quality of the composite assembly is determined. A higher ratio of uniform resin to non-uniform resin indicates a good quality composite assembly and a higher ratio of non-uniform resin to uniform resin indicates a bad quality.

The present disclosure thus includes, without limitation, the following example implementations.

Some example implementations provide a method of inspecting a composite assembly that includes a core coated with resin, the method comprising: accessing an image of a cross section of the core, the image having a dot matrix data structure with a matrix of intensity values; identifying a subset of the intensity values that describe a distribution of the resin on the core; classifying the intensity values of the subset of the intensity values as uniform to indicate a uniform distribution of the resin on the core, or non-uniform to indicate a non-uniform distribution of the resin on the core; performing a first comparison of a number of the intensity values classified as uniform and a total number of the intensity values of the subset, or a second comparison of the number of the intensity values classified as non-uniform and the total number of the intensity values of the subset; determining a quality of the composite assembly based on the first comparison or the second comparison as performed; and outputting an indication of the quality of the composite assembly.

Some other example implementations provide an apparatus for inspecting a composite assembly that includes a core coated with resin, the apparatus comprising: a memory configured to store computer-readable program code; and processing circuitry configured to access the memory, and execute the computer-readable program code to cause the apparatus to at least: access an image of a cross section of the core, the image having a dot matrix data structure with a matrix of intensity values; identify a subset of the intensity values that describe a distribution of the resin on the core; classify the intensity values of the subset of the intensity values as uniform to indicate a uniform distribution of the resin on the core, or non-uniform to indicate a non-uniform distribution of the resin on the core; perform a first comparison of a number of the intensity values classified as uniform and a total number of the intensity values of the subset, or a second comparison of the number of the intensity values classified as non-uniform and the total number of the intensity values of the subset; determine a quality of the composite assembly based on the first comparison or the second comparison as performed; and output an indication of the quality of the composite assembly.

Some other example implementations provide a computer-readable storage medium for inspecting a composite assembly that includes a core coated with resin, the computer-readable storage medium being non-transitory and having computer-readable program code stored therein that, in response to execution by processing circuitry, causes an apparatus to at least: access an image of a cross section of the core, the image having a dot matrix data structure with a matrix of intensity values; identify a subset of the intensity values that describe a distribution of the resin on the core; classify the intensity values of the subset of the intensity values as uniform to indicate a uniform distribution of the resin on the core, or non-uniform to indicate a non-uniform distribution of the resin on the core; perform a first comparison of a number of the intensity values classified as uniform and a total number of the intensity values of the subset, or a second comparison of the number of the intensity values classified as non-uniform and the total number of the intensity values of the subset; determine a quality of the composite assembly based on the first comparison or the second comparison as performed; and output an indication of the quality of the composite assembly.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 5A:
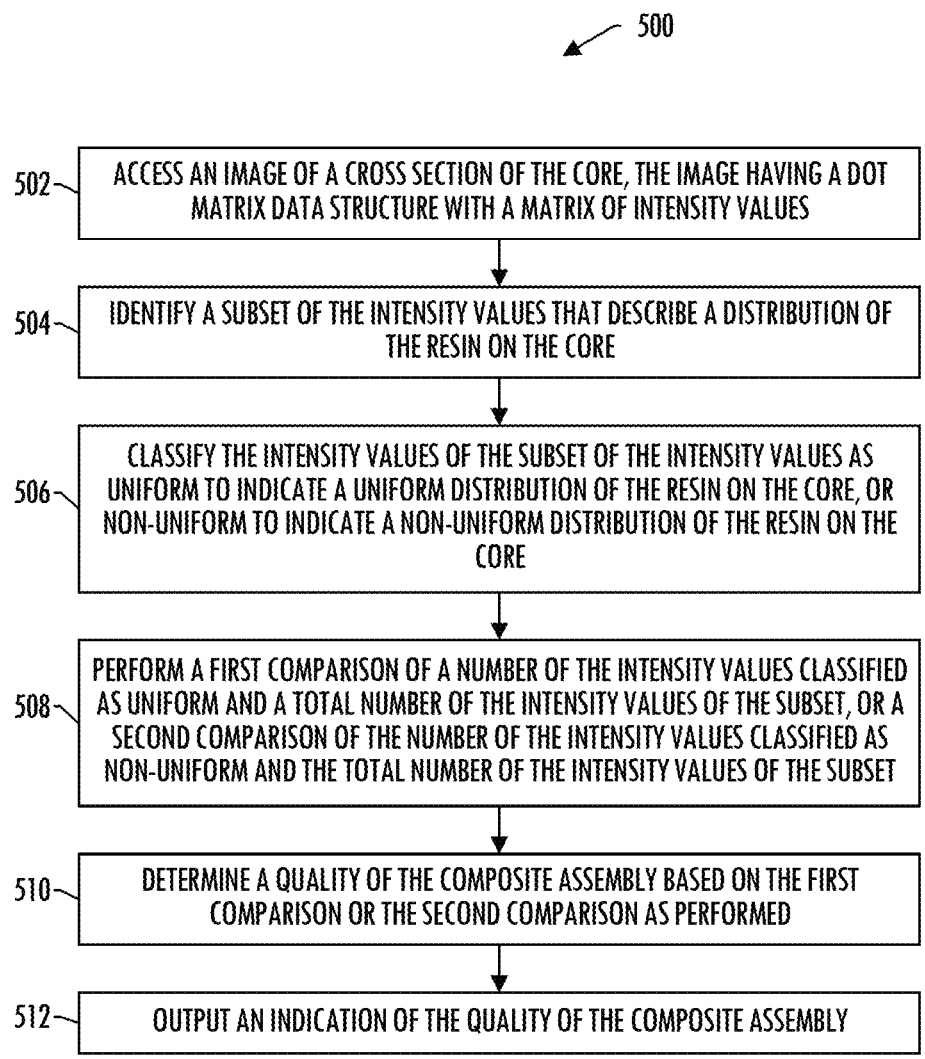
Figure 5B:
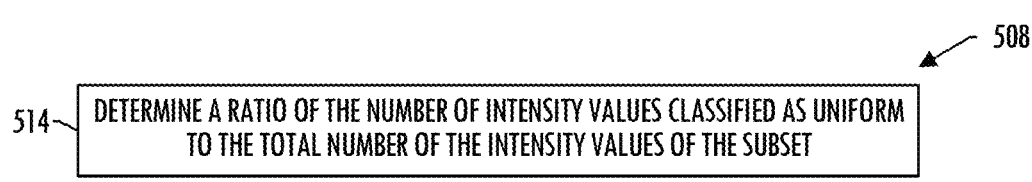
Figure 5C:
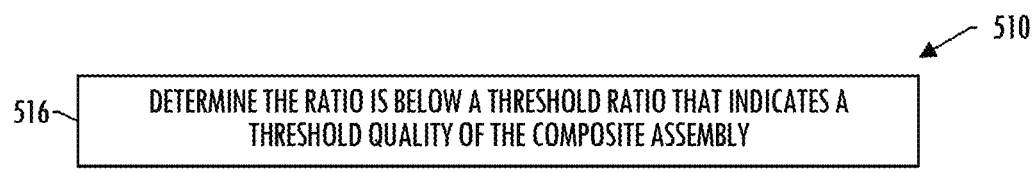
Figure 5D:
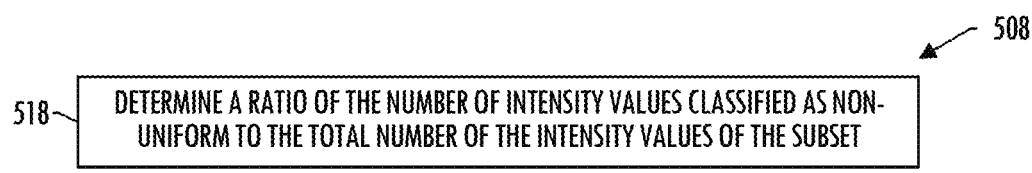
Figure 5E:
Figure 5F:
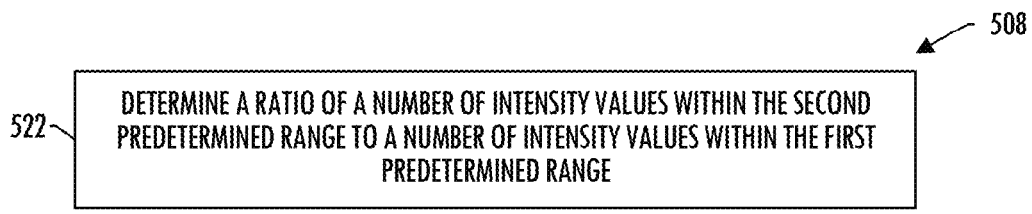
Figure 5G:
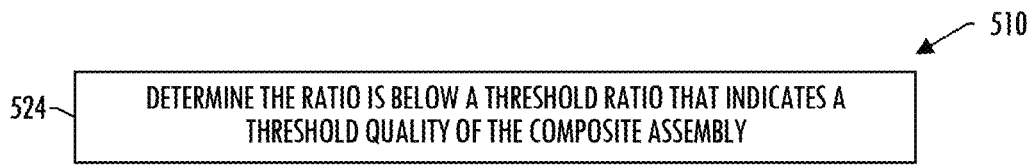
Figure 5H:
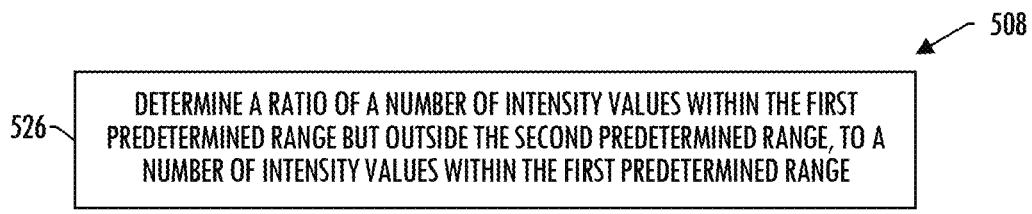
Figure 6:
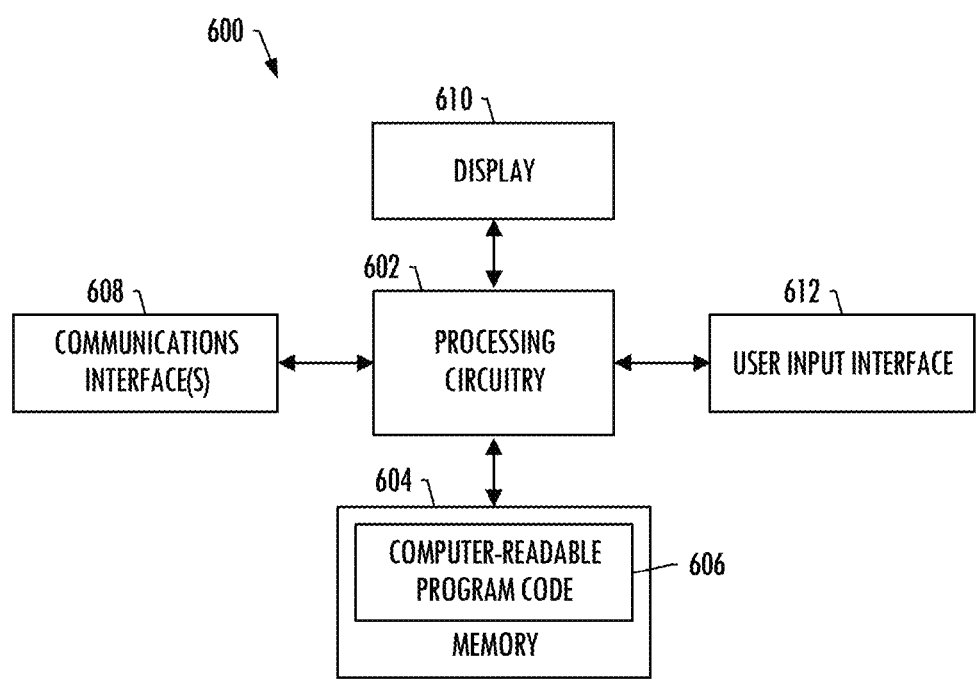

FIGS. 4A, 4B, 4C, 4D, and 4E are illustrations of a cross section of a honeycomb core of a composite assembly, according to some example implementations;

FIGS. 5A, 5B, 5C, 5D, 5E, 5F, 5G, 5H and SI are flowcharts illustrating various steps in a method of inspecting a composite assembly, according to some example implementations; and FIG. 6 illustrates an apparatus for inspecting a composite assembly, according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to vehicular engineering and, in particular, to one or more of the design, construction, operation or use of vehicles. As used herein, a vehicle is a machine designed as an instrument of conveyance by land, water or air. A vehicle designed and configurable to fly may at times be referred to as an aerial vehicle, an aircraft or the like. Other examples of suitable vehicles include any of a number of different types of ground vehicles (e.g., motor vehicles, railed vehicles), watercraft, amphibious vehicles, spacecraft and the like.

A vehicle generally includes a basic structure, and a propulsion system coupled to the basic structure. The basic structure is the main supporting structure of the vehicle to which other components are attached. The basic structure is the load-bearing framework of the vehicle that structurally supports the vehicle in its construction and function. In various contexts, the basic structure may be referred to as a chassis, an airframe or the like.

The propulsion system includes one or more engines or motors configured to power one or more propulsors to generate propulsive forces that cause the vehicle to move. A propulsor is any of a number of different means of converting power into a propulsive force. Examples of suitable propulsors include rotors, propellers, wheels and the like. In some examples, the propulsion system includes a drivetrain configured to deliver power from the engines/motors to the propulsors. The engines/motors and drivetrain may in some contexts be referred to as the powertrain of the vehicle.

Figure 1:
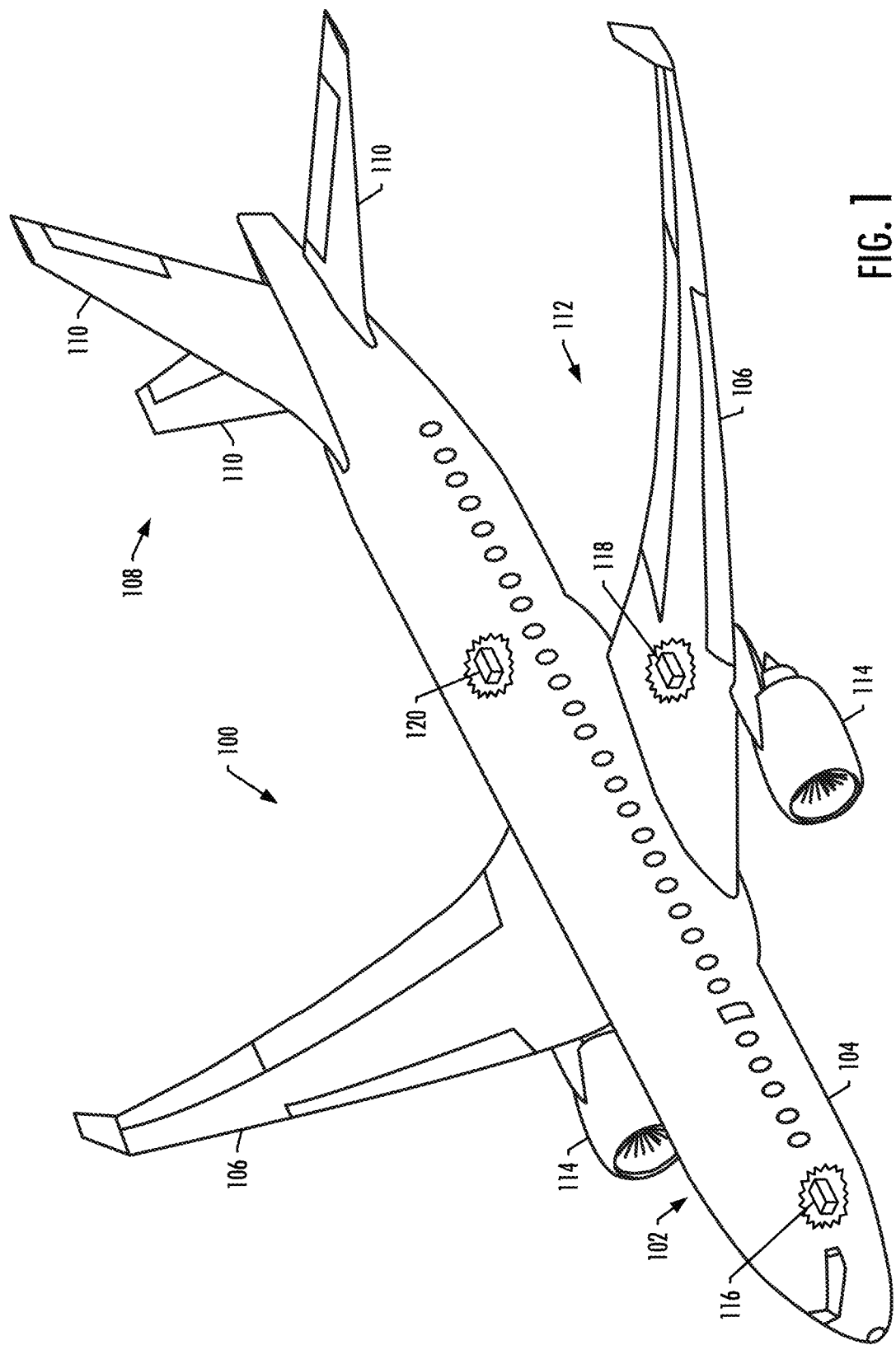
FIG. 1 illustrates one type of vehicle, namely, an aircraft that may benefit from example implementations of the present disclosure.

FIG. 1 illustrates one type of vehicle, namely, an aircraft 100 that may benefit from example implementations of the present disclosure. As shown, the aircraft includes a basic structure with an airframe 102 including a fuselage 104. The airframe also includes wings 106 that extend from opposing sides of the fuselage, an empennage or tail assembly 108 at a rear end of the fuselage, and the tail assembly includes stabilizers 110. The aircraft also includes a plurality of high-level systems 112 such as a propulsion system. In the particular example shown in FIG. 1, the propulsion system includes two wing-mounted engines 114 configured to power propulsors to generate propulsive forces that cause the aircraft to move. In other implementations, the propulsion system can include other arrangements, for example, engines carried by other portions of the aircraft including the fuselage and/or the tail. As also shown, the high-level systems may also include an electrical system 116, hydraulic system 118 and/or environmental system 120. Any number of other systems may be included.

Figure 2:
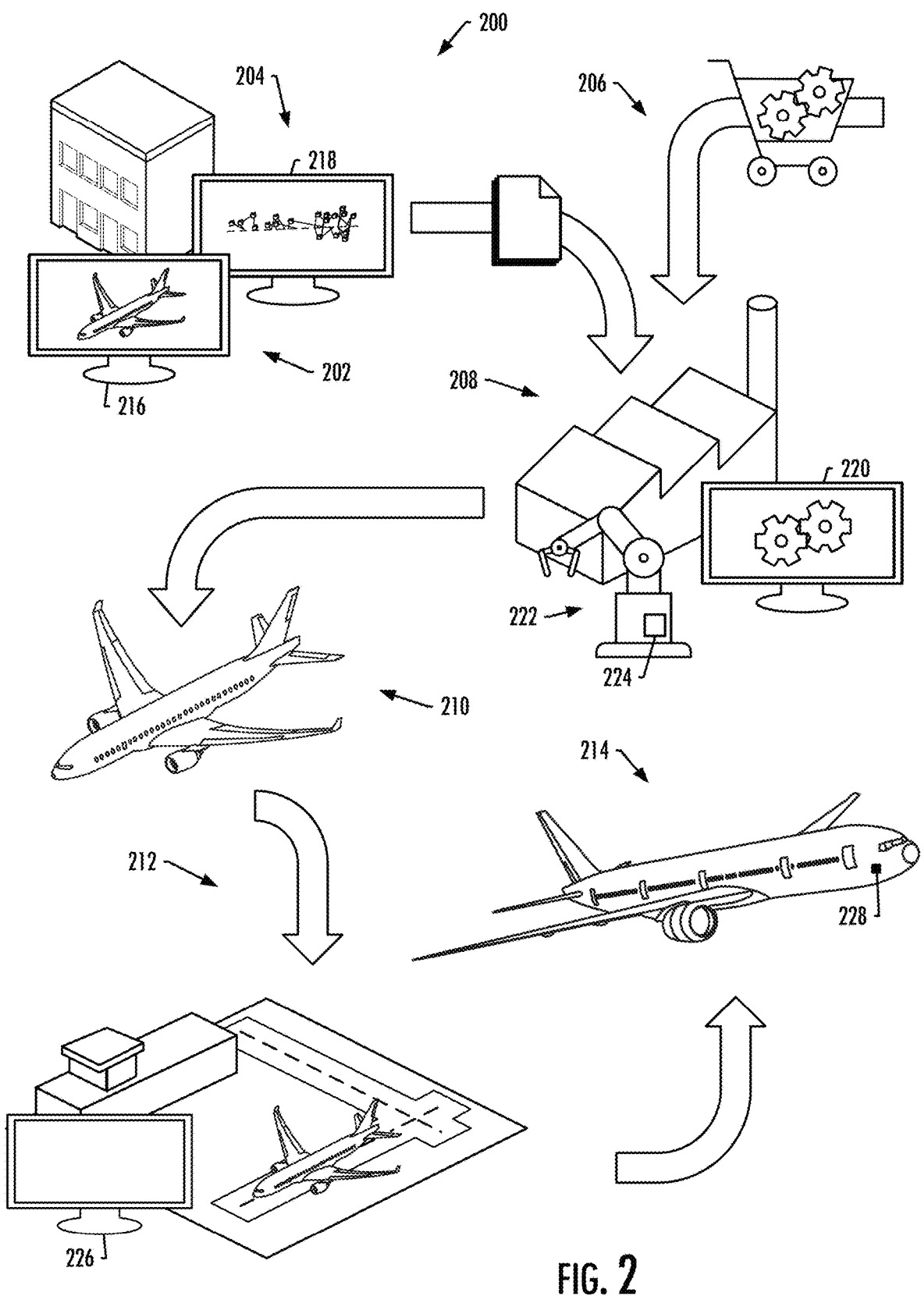
FIG. 2 illustrates an aircraft manufacturing and service method, according to some example implementations.

As explained above, example implementations of the present disclosure relate generally to vehicular engineering and, in particular, to one or more of the design, construction, operation or use of vehicles such as aircraft 100. Thus, referring now to FIG. 2, example implementations may be used in the context of an aircraft manufacturing and service method 200. During pre-production, the example method may include specification and design 202 of the aircraft, manufacturing sequence and processing planning 204 and material procurement 206. During production, component and subassembly manufacturing 208 and system integration 210 of the aircraft takes place. Thereafter, the aircraft may go through certification and delivery 212 in order to be placed in service 214. While in service by an operator, the aircraft may be scheduled for maintenance and service (which may also include modification, reconfiguration, refurbishment or the like).

Each of the processes of the example method 200 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

As will also be appreciated, computers are often used throughout the method 200; and in this regard, a "computer" is generally a machine that is programmable or programmed to perform functions or operations. The method as shown makes use of a number of example computers. These computers include computers 216, 218 used for the specification and design 202 of the aircraft, and the manufacturing sequence and processing planning 204. The method may also make use of computers 220 during component and subassembly manufacturing 208, which may also make use of computer numerical control (CNC) machines 222 or other robotics that are controlled by computers 224. Even further, computers 226 may be used while the aircraft is in service 214, as well as during maintenance and service; and as suggested in FIG. 1, the aircraft may itself include one or more computers 228 as part of or separate from its electrical system 116.

A number of the computers 216, 218, 220, 224, 226, 228 used in the method 200 may be co-located or directly coupled to one another, or in some examples, various ones of the computers may communicate with one another across one or more computer networks. Further, although shown as part of the method, it should be understood that any one or more of the computers may function or operate separate from the method, without regard to any of the other computers. It should also be understood that the method may include one or more additional or alternative computers than those shown in FIG. 2.

Figure 3:
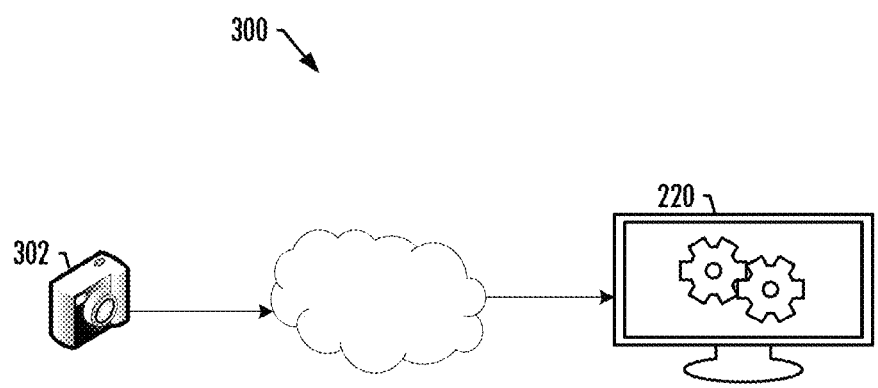
FIG. 3 illustrates an example system for performing inspection of a composite assembly, according to some example implementations.

Example implementations of the present disclosure can be implemented throughout the aircraft manufacturing and service method 200, but are particularly well suited for implementation during production. In this regard, FIG. 3 illustrates a system 300 for inspecting a composite assembly that includes a core coated with resin. In some example implementations, the system includes a computer, such as computer 220, that is configured to access an image of a cross section of the core of the composite assembly. The image can be captured by any appropriate image capturing device, such as camera 302. The computer can access the image captured by the camera by any suitable means including via direct connection, wireless connection, via a data store (e.g., data-stick, memory card, SD card, etc.), or over a computer network where the image is stored.

In some example implementations, the image has a dot matrix data structure with a matrix of intensity values. Each of the intensity values corresponds to an intensity of a pixel of the image. In some examples, the image that is accessed is a grayscale image of the cross section of the core. In such an example, the intensity values corresponds to how close to black or how close to white the pixel is. In some examples, the intensity values range from 0 to 255, where an intensity of 0 represents the darkest shade of black and an intensity of 255 represents the lightest shade of white. These ranges can be reversed in some cases where an intensity of 255 represents the darkest shade of black and an intensity of 0 represents the lightest shade of white.

The computer 220 is configured to identify a subset of the intensity values that describes a distribution of the resin on the core. To do this, the computer is configured to inspect the dot matrix data structure, and determine which of the intensity values are within a preselected range of intensity values that are known to indicate resin. To arrive at the preselected range, an analysis of known core images can be performed and the preselected range of intensity values selected based on intensity values where known resin is located on the image. Similarly, in some implementations, the computer is configured to identify shadows and exposed paper on the image. Shadows and exposed paper are also identified by the computer inspecting the image and determining which of the intensity values fall within respective corresponding intensity value thresholds. An example of these determinations is described in FIGS. 4A— 4E.

The computer 220 is configured to classify the intensity values of the subset of the intensity values as uniform to indicate a uniform distribution of the resin on the core, or non-uniform to indicate a non-uniform distribution of the resin on the core. The computer again performs this classification based on preselected ranges of intensity that indicate uniform or non-uniform resin. For example, the preselected range of intensity values indicating uniform resin can be determined based on inspecting intensity values of known uniform resin. Likewise, the preselected range of intensity values indicating non-uniform resin can be determined base don inspecting intensity values of known non-uniform resin. These preselected ranges can then be used to classify the intensity values of the subset.

The computer 220 is configured to perform a first comparison of a number of the intensity values classified as uniform and a total number of the intensity values of the subset, or a second comparison of the number of the intensity values classified as non-uniform and the total number of the intensity values of the subset. The ratio of uniform resin to non-uniform resin, and vice-versa, can predict the subsequent structural performance, or quality, of the composite assembly. The computer is configured to determine a quality of the composite assembly based on the first comparison or the second comparison as performed.

The computer 220 is further configured to output an indication of the quality of the composite assembly. The indication can be output in any of a number of different manners, either locally on the computer such as in the case of an alert or other notification on a display of the computer, or remotely such as in the case of a text, email or other message (including an alert or other notification) that is sent to another computer. The indication can indicate that the quality of the composite assembly is unacceptable for use in manufacturing, for example, if the ratio of non-uniform resin is too high or if the ratio of uniform resin is too low.

In some examples, the subset of the intensity values that is identified describes the distribution of resin on the core, the core being a non-metallic honeycomb core. In some examples, the composite assembly includes the non-metallic honeycomb core adhered to two skins in a sandwich-structured composite assembly. In such an example, the image that is accessed is of the cross section of the non-metallic honeycomb core taken perpendicular to the two skins.

In some examples in which the first comparison (of the intensity values classified as uniform) is performed, the computer 220 is configured to determine a ratio of the number of intensity values classified as uniform to the total number of the intensity values of the subset. The quality of the composite assembly can then be determined based on the ratio. If the ratio is above a threshold ratio, then it indicates that the quality of the component assembly is of sufficient quality for use in manufacturing of the aircraft.

In some examples, the computer 220 configured to determine the quality of the composite assembly includes the computer configured to determine the ratio is below a threshold ratio that indicates a threshold quality of the composite assembly. The indication of the quality of the composite assembly that is output includes an alert that indicates the quality is below the threshold quality. If the ratio is below the threshold quality, the composite assembly is deemed of insufficient quality for use in manufacturing the aircraft. The threshold quality is variable based on the type of component assembly and its structural and safety requirements as part of the aircraft.

In some examples in which the second comparison (of the intensity values classified as non-uniform) is performed, the computer 220 is configured to determine a ratio of the number of intensity values classified as non-uniform to the total number of the intensity values of the subset. The quality of the composite assembly can then be determined based on the ratio.

In some examples, the computer 220 configured to determine the quality of the composite assembly includes the computer configured to determine the ratio is above a threshold ratio that indicates a threshold quality of the composite assembly. The threshold ratio can be determined based on a given standard (e.g., manufacturing standard or tolerance) or based on a predetermined ratio based on prior experimentation or testing. The indication of the quality of the composite assembly that is output includes an alert that indicates the quality is below the threshold quality. For example, an alert including an indicator on a display of the computer, SMS text message sent to a phone, email, audible noise, visual indicator, or other alert can be used to indicate to the user of the computer that the quality of the composite assembly is below a threshold quality.

In some examples, the intensity values of the subset that is identified are those of the intensity values of the matrix of intensity values within a first predetermined range of intensity values that indicates resin on the core. For example, as described below, a predetermined range, such as between 50 and 145, of intensity values can be set as indicating resin on the core. Meaning, if a matrix entry of the matrix of intensity values has an intensity value of 55 or 100, it will fall within the first predetermined range and indicate resin on the core. If the matrix entry is 10 or 165, it will not fall within the first predetermined range, and therefore will indicate something other than resin, such as shadows, or exposed paper.

In some examples, the first comparison (of the intensity values classified as uniform) is performed, and those of the intensity values classified as uniform are within a second predetermined range of intensity values that is within the first predetermined range and that indicates uniform distribution of resin. The second predetermined range is within the first predetermined range, meaning, if the first predetermined range is between 50 and 145, then the second predetermined range could be, for example, between 65 and 145, which clearly falls within the first predetermined range.

In some examples, the computer 220 configured to perform the first comparison includes the computer configured to determine a ratio of a number of intensity values within the second predetermined range to a number of intensity values within the first predetermined range. An example of determining the ratio of the number of intensity values within the second predetermined range to the number of intensity values within the first predetermined range is presented in the description of FIGS. 4A-4E. The quality of the composite assembly is determined based on the ratio. Essentially, determining the ratio in the first comparison determines the ratio of uniform resin (i.e., within the second predetermined range) to the total amount of resin detected (i.e., within the first predetermined range).

In some examples, the computer 220 configured to determine the quality of the composite assembly includes the computer configured to determine the ratio is below a threshold ratio that indicates a threshold quality of the composite assembly. The indication of the quality of composite assembly that is output includes an alert that indicates the quality is below the threshold quality, and is therefore unsuitable for use in manufacturing of the aircraft. For example, if the threshold ratio is 90% uniform resin, and the first comparison is performed and it is determined that the image includes 88% uniform resin, then the alert would trigger because 88% is below the threshold ratio.

In some examples, the second comparison (of the intensity values classified as non-uniform) is performed, and those of the intensity values classified as non-uniform are within the first predetermined range but outside a second predetermined range of intensity values that is within the first predetermined range and that indicates uniform distribution of resin. Using the example provided above, if the first predefined range was between 50 and 145, and the second predefined range was between 65 and 145, the non-uniform resin would fall between 50 and 65, which is within the broader first predefined range, but not within the second predefined range.

In some examples, the computer 220 configured to perform the second comparison includes the computer configured to determine a ratio of a number of intensity values within the first predetermined range but outside the second predetermined range, to a number of intensity values within the first predetermined range. Essentially, determining the ratio in the second comparison determines the ratio of non-uniform resin (i.e., within the first predetermined range, but not within the second predetermined range) to the total amount of resin detected (i.e., within the first predetermined range).

In some examples, the computer 220 configured to determine the quality of the composite assembly includes the computer configured to determine the ratio is above a threshold ratio that indicates a threshold quality of the composite assembly. The indication of the quality of the composite assembly that is output includes an alert that indicates the quality is below the threshold quality. For example, if the threshold ratio is 10% non-uniform resin, and the second comparison is performed and it is determined that the image includes 12% non-uniform resin, then the alert would trigger because 12% is above the threshold ratio.

Figure 4A:
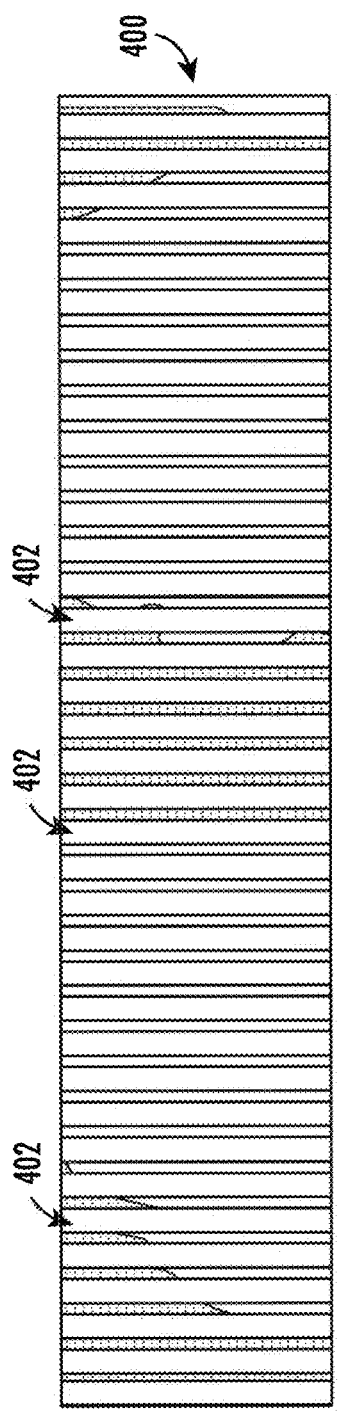

FIGS. 4A through 4E illustrate an example analysis performed by a method according to some implementations of the present disclosure. FIG. 4A is an illustration 400 of a cross section of a core of a composite assembly. The honeycomb cells 402 are clearly visible and appear as tubes or cylinders whose lengths run vertical with respect to the illustration.

Figure 4B:
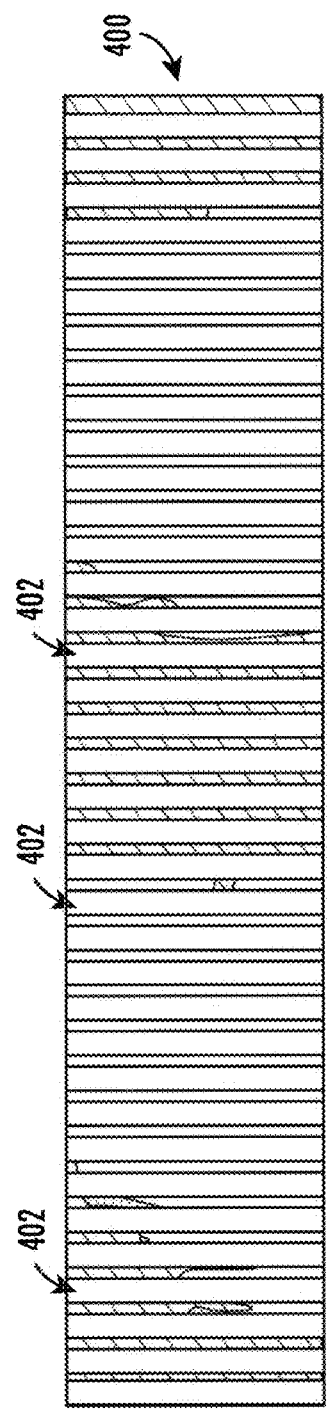

FIG. 4B depicts the illustration 400 analyzed by example methods described herein where shadows of the illustration are identified. The shadows are identified by determining which intensity values of the illustration fall within a shadow intensity range. The shadow intensity range can be a predetermined intensity range based on the intensity of known shadows. For example, a predetermined intensity range of 0-50 can be selected as the shadow intensity range. Therefore, in the illustration, if the computer inspects a intensity value and it falls between 0 and 50, it is determined to be a shadow. In this example, the illustration is approximately 6% shadow.

Similarly, FIG. 4C depicts the illustration 400 analyzed where non-uniform resin is detected. Here, as an example, intensity values lying between a predetermined non-uniform resin range, such as between 50 and 65, are determined to be intensity values indicating non-uniform resin. The predetermined non-uniform resin range can be selected based on the computer inspecting known non-uniform resin and setting the predetermined range to be a range of intensity values in which the non-uniform resin falls within. In this example, the illustration is approximately 5% non-uniform resin.

FIG. 4D depicts the illustration 400 analyzed where uniform resin is detected. Here, as an example, intensity values lying between a predetermined uniform resin range, such as between 65 and 145, are determined to be intensity values indicating uniform resin. The predetermined uniform resin range can be selected based on the computer inspecting known uniform resin and setting the predetermined uniform resin range to be a intensity value range in which the uniform resin falls within. In this example, the illustration is approximately 61% uniform resin.

The combination of the predetermined non-uniform resin range and the predetermined uniform resin range make up the subset of the intensity values described above.

In some implementations the first predetermined range of intensity values described above includes all the intensity values of the subset. In other words, the first predetermined range of intensity values includes all of the intensity values that indicate resin on the core, whether uniform or non-uniform resin. The second predetermined range of intensity values described above includes only the intensity values that indicate uniform resin on the core and excludes the intensity values that indicate non-uniform resin. Therefore, the intensity values indicating non-uniform resin are within the first predetermined range of intensity values, but outside of the second predetermined range of intensity values, the second predetermined range of intensity values lying within the first predetermined range of intensity values.

The first comparison (of the intensity values classified as uniform) described above involves comparing the number of intensity values indicating uniform resin (i.e., falling within the second predetermined range) to the total number of intensity values indicating resin (i.e., the first predetermined range), whether uniform or not. A ratio of uniform resin is calculated. In the example shown in FIGS. 4C and 4D, 66% of the intensity values indicate some form of resin (i.e., 61% uniform resin and 5% non-uniform resin), and therefore, the ratio of uniform resin to total resin is about 93% (i.e., 61/66).

The second comparison (of the intensity values classified as non-uniform) described above involves comparing the number of intensity values indicating non-uniform resin (i.e., falling within the first predetermined range, but outside of the second predetermined range) to the total number of intensity values indicating resin, uniform or non-uniform (i.e., falling within the first predetermined range). A ratio of non-uniform resin is calculated. In the example shown in FIGS. 4C and 4D, 5% of the intensity values indicate non-uniform resin, and therefore, the ratio of non-uniform resin to total resin is about 7% (i.e., 5/66).

Figure 4E:
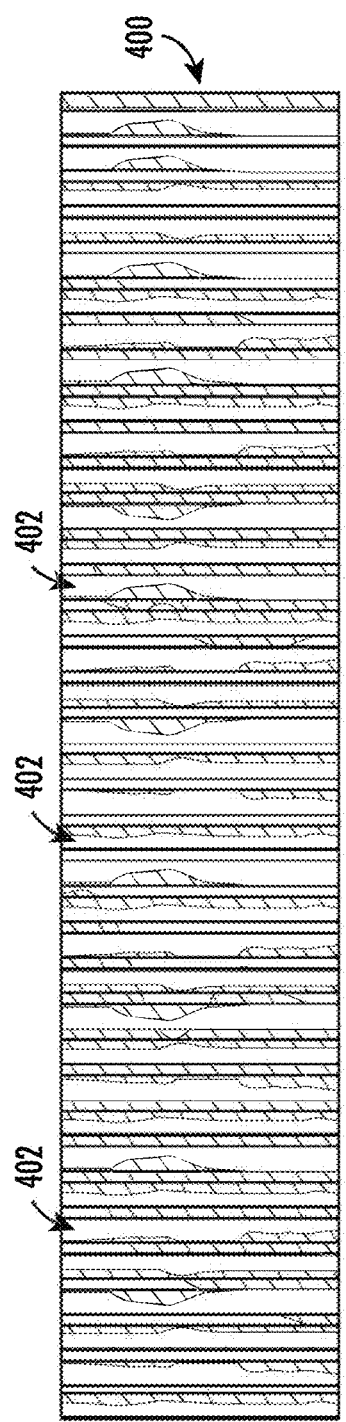

FIG. 4E depicts the illustration 400 analyzed where exposed paper is detected. Here, as an example, intensity values lying between a predetermined exposed paper range, such as between 145-255, are determined to be intensity values indicating exposed paper. The predetermined exposed paper range can be selected based on the computer inspecting known exposed paper and setting the predetermined exposed paper range to be a range of intensity values in which the exposed paper falls within. In this example, the illustration is approximately 28% exposed paper.

FIGS. 5A-5I are flowcharts illustrating various steps in a method 500 of inspecting a composite assembly that includes a core coated with resin, according to various example implementations of the present disclosure. The method includes accessing an image of a cross section of the core, the image having a dot matrix data structure with a matrix of intensity values, as shown at block 502 of FIG. 5A. The method includes identifying a subset of the intensity values that describe a distribution of the resin on the core, as shown at block 504. The method includes classifying the intensity values of the subset of the intensity values as uniform to indicate a uniform distribution of the resin on the core, or non-uniform to indicate a non-uniform distribution of the resin on the core, as shown at block 506. The method includes performing a first comparison of a number of the intensity values classified as uniform and a total number of the intensity values of the subset, or a second comparison of the number of the intensity values classified as non-uniform and the total number of the intensity values of the subset, as shown at block 508. The method includes determining a quality of the composite assembly based on the first comparison or the second comparison as performed, as shown at block 510. And the method includes outputting an indication of the quality of the composite assembly, as shown at block 512.

In some examples, the image that is accessed at block 502 is a grayscale image of the cross section of the core.

In some examples, the first comparison is performed at block 508, and performing the first comparison includes determining a ratio of the number of intensity values classified as uniform to the total number of the intensity values of the subset, as shown at block 514 of FIG. 5B. In some of these examples, the quality of the composite assembly is determined at block 510 based on the ratio.

In some further examples, determining the quality of the composite assembly at block 510 includes determining the ratio is below a threshold ratio that indicates a threshold quality of the composite assembly, as shown at block 516 of FIG. 5C. And in some of these examples, the indication of the quality of the composite assembly that is output at block 512 includes an alert that indicates the quality is below the threshold quality.

In some examples, the second comparison is performed at block 508, and performing the second comparison includes determining a ratio of the number of intensity values classified as non-uniform to the total number of the intensity values of the subset, as shown at block 518 of FIG. 5D. In some of these examples, the quality of the composite assembly is determined at block 510 based on the ratio.

In some further examples, determining the quality of the composite assembly at block 510 includes determining the ratio is above a threshold ratio that indicates a threshold quality of the composite assembly, as shown at block 520 of FIG. 5E. In some of these further examples, the indication of the quality of the composite assembly that is output at block 512 includes an alert that indicates the quality is below the threshold quality.

In some examples, the intensity values of the subset that is identified at block 504 are those of the intensity values of the matrix of intensity values within a first predetermined range of intensity values that indicates resin on the core.

In some examples, the first comparison is performed at block 508, and those of the intensity values classified as uniform are within a second predetermined range of intensity values that is within the first predetermined range and that indicates uniform distribution of resin.

In some examples, performing the first comparison at block 508 includes determining a ratio of a number of intensity values within the second predetermined range to a number of intensity values within the first predetermined range, as shown at block 522 of FIG. 5F. In some of these examples, the quality of the composite assembly is determined at block 510 based on the ratio.

In some examples, determining the quality of the composite assembly at block 510 includes determining the ratio is below a threshold ratio that indicates a threshold quality of the composite assembly, as shown at block 524 of FIG. 5G. In some of these examples, the indication of the quality of composite assembly that is output at block 512 includes an alert that indicates the quality is below the threshold quality.

In some examples, the second comparison is performed at block 508, and those of the intensity values classified as non-uniform are within the first predetermined range but outside a second predetermined range of intensity values that is within the first predetermined range and that indicates uniform distribution of resin.

In some further examples, performing the second comparison at block 508 includes determining a ratio of a number of intensity values within the first predetermined range but outside the second predetermined range, to a number of intensity values within the first predetermined range, as shown at block 526 of FIG. 5H.

Figure 5I:
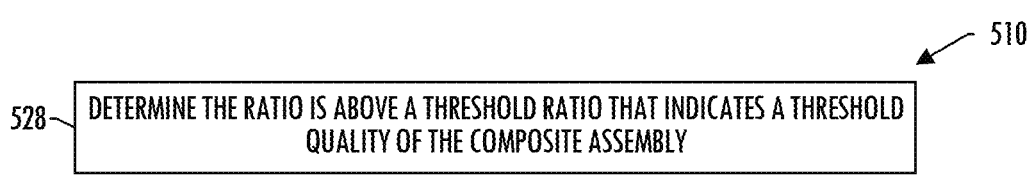

In some yet further examples, determining the quality of the composite assembly at block 510 includes determining the ratio is above a threshold ratio that indicates a threshold quality of the composite assembly, as shown at block 528 of FIG. 5I In some of these examples, the indication of the quality of the composite assembly that is output at block 512 includes an alert that indicates the quality is below the threshold quality.

In some examples, the subset of the intensity values that is identified at block 504 describes the distribution of resin on the core that is a non-metallic honeycomb core. And in some further examples, the composite assembly includes the non-metallic honeycomb core adhered to two skins in a sandwich-structured composite assembly, and the image that is accessed at block 502 is of the cross section of the non-metallic honeycomb core taken perpendicular to the two skins.

According to example implementations of the present disclosure, the system 300 and its subsystems (including computer 220) can be implemented by various means. Means for implementing the system and its subsystems can include hardware, alone or under direction of one or more computer programs from a computer-readable storage medium. In some examples, one or more apparatuses can be configured to function as or otherwise implement the system and its subsystems shown and described herein. In examples involving more than one apparatus, the respective apparatuses can be connected to or otherwise in communication with one another in a number of different manners, such as directly or indirectly via a wired or wireless network or the like.

FIG. 6 illustrates an apparatus 600 according to some example implementations of the present disclosure. Generally, an apparatus of exemplary implementations of the present disclosure can comprise, include or be embodied in one or more fixed or portable electronic devices. Examples of suitable electronic devices include a smartphone, tablet computer, laptop computer, desktop computer, workstation computer, server computer or the like. The apparatus can include one or more of each of a number of components such as, for example, processing circuitry 602 (e.g., processor unit) connected to a memory 604 (e.g., storage device).

The processing circuitry 602 can be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which can be packaged as an integrated circuit or multiple interconnected integrated circuits (an integrated circuit at times more commonly referred to as a "chip"). The processing circuitry can be configured to execute computer programs, which can be stored onboard the processing circuitry or otherwise stored in the memory 604 (of the same or another apparatus).

The processing circuitry 602 can be a number of processors, a multi-core processor or some other type of processor, depending on the particular implementation. Further, the processing circuitry can be implemented using a number of heterogeneous processor systems in which a main processor is present with one or more secondary processors on a single chip. As another illustrative example, the processing circuitry can be a symmetric multi-processor system containing multiple processors of the same type. In yet another example, the processing circuitry can be embodied as or otherwise include one or more ASICs, FPGAs or the like. Thus, although the processing circuitry can be capable of executing a computer program to perform one or more functions, the processing circuitry of various examples can be capable of performing one or more functions without the aid of a computer program. In either instance, the processing circuitry can be appropriately programmed to perform functions or operations according to example implementations of the present disclosure.

The memory 604 is generally any piece of computer hardware that is capable of storing information such as, for example, data, computer programs (e.g., computer-readable program code 606) and/or other suitable information either on a temporary basis and/or a permanent basis. The memory can include volatile and/or non-volatile memory, and can be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks can include compact disk-read only memory (CD-ROM), compact disk-read/write (CD-R/W), DVD or the like. In various instances, the memory can be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein can generally refer to a computer-readable storage medium or computer-readable transmission medium.

In addition to the memory 604, the processing circuitry 602 can also be connected to one or more interfaces for displaying, transmitting and/or receiving information. The interfaces can include a communications interface 608 (e.g., communications unit) and/or one or more user interfaces. The communications interface can be configured to transmit and/or receive information, such as to and/or from other apparatus(es), network(s) or the like. The communications interface can be configured to transmit and/or receive information by physical (wired) and/or wireless communications links. Examples of suitable communication interfaces include a network interface controller (NIC), wireless NIC (WNIC) or the like.

The user interfaces can include a display 610 and/or one or more user input interfaces 612 (e.g., input/output unit). The display can be configured to present or otherwise display information to a user, suitable examples of which include a liquid crystal display (LCD), light-emitting diode display (LED), plasma display panel (PDP) or the like. The user input interfaces can be wired or wireless, and can be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces can further include one or more interfaces for communicating with peripherals such as printers, scanners or the like.

As indicated above, program code instructions can be stored in memory, and executed by processing circuitry that is thereby programmed, to implement functions of the systems, subsystems, tools and their respective elements described herein. As will be appreciated, any suitable program code instructions can be loaded onto a computer or other programmable apparatus from a computer-readable storage medium to produce a particular machine, such that the particular machine becomes a means for implementing the functions specified herein. These program code instructions can also be stored in a computer-readable storage medium that can direct a computer, a processing circuitry or other programmable apparatus to function in a particular manner to thereby generate a particular machine or particular article of manufacture. The instructions stored in the computer-readable storage medium can produce an article of manufacture, where the article of manufacture becomes a means for implementing functions described herein. The program code instructions can be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions can be performed sequentially such that one instruction is retrieved, loaded and executed at a time. In some example implementations, retrieval, loading and/or execution can be performed in parallel such that multiple instructions are retrieved, loaded, and/or executed together. Execution of the program code instructions can produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 600 can include a processing circuitry 602 and a computer-readable storage medium or memory 604 coupled to the processing circuitry, where the processing circuitry is configured to execute computer-readable program code 606 stored in the memory. It will also be understood that one or more functions, and combinations of functions, can be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for inspecting a composite assembly that includes a core coated with resin, the apparatus comprising: a memory configured to store computer-readable program code; and processing circuitry configured to access the memory, and execute the computer-readable program code to cause the apparatus to at least: access an image of a cross section of the core, the image having a dot matrix data structure with a matrix of intensity values; identify a subset of the intensity values that describe a distribution of the resin on the core; classify the intensity values of the subset of the intensity values as uniform to indicate a uniform distribution of the resin on the core, or non-uniform to indicate a non-uniform distribution of the resin on the core; perform a first comparison of a number of the intensity values classified as uniform and a total number of the intensity values of the subset, or a second comparison of the number of the intensity values classified as non-uniform and the total number of the intensity values of the subset; determine a quality of the composite assembly based on the first comparison or the second comparison as performed; and output an indication of the quality of the composite assembly.

Clause 2. The apparatus of clause 1, wherein the image that is accessed is a grayscale image of the cross section of the core.

Clause 3. The apparatus of clause 1 or clause 2, wherein the first comparison is performed, and the apparatus caused to perform the first comparison includes the apparatus caused to determine a ratio of the number of intensity values classified as uniform to the total number of the intensity values of the subset, and wherein the quality of the composite assembly is determined based on the ratio.

Clause 4. The apparatus of clause 3, wherein the apparatus caused to determine the quality of the composite assembly includes the apparatus caused to determine the ratio is below a threshold ratio that indicates a threshold quality of the composite assembly, and wherein the indication of the quality of the composite assembly that is output includes an alert that indicates the quality is below the threshold quality.

Clause 5. The apparatus of any of clauses 1 to 4, wherein the second comparison is performed, and the apparatus caused to perform the second comparison includes the apparatus caused to determine a ratio of the number of intensity values classified as non-uniform to the total number of the intensity values of the subset, and wherein the quality of the composite assembly is determined based on the ratio.

Clause 6. The apparatus of clause 5, wherein the apparatus caused to determine the quality of the composite assembly includes the apparatus caused to determine the ratio is above a threshold ratio that indicates a threshold quality of the composite assembly, and wherein the indication of the quality of the composite assembly that is output includes an alert that indicates the quality is below the threshold quality.

Clause 7. The apparatus of any of clauses 1 to 6, wherein the intensity values of the subset that is identified are those of the intensity values of the matrix of intensity values within a first predetermined range of intensity values that indicates resin on the core.

Clause 8. The apparatus of clause 7, wherein the first comparison is performed, and those of the intensity values classified as uniform are within a second predetermined range of intensity values that is within the first predetermined range and that indicates uniform distribution of resin.

Clause 9. The apparatus of clause 8, wherein the apparatus caused to perform the first comparison includes the apparatus caused to determine a ratio of a number of intensity values within the second predetermined range to a number of intensity values within the first predetermined range, and wherein the quality of the composite assembly is determined based on the ratio.

Clause 10. The apparatus of clause 9, wherein the apparatus caused to determine the quality of the composite assembly includes the apparatus caused to determine the ratio is below a threshold ratio that indicates a threshold quality of the composite assembly, and wherein the indication of the quality of composite assembly that is output includes an alert that indicates the quality is below the threshold quality.

Clause 11. The apparatus of any of clauses 7 to 10, wherein the second comparison is performed, and those of the intensity values classified as non-uniform are within the first predetermined range but outside a second predetermined range of intensity values that is within the first predetermined range and that indicates uniform distribution of resin.

Clause 12. The apparatus of clause 11, wherein the apparatus caused to perform the second comparison includes the apparatus caused to determine a ratio of a number of intensity values within the first predetermined range but outside the second predetermined range, to a number of intensity values within the first predetermined range.

Clause 13. The apparatus of clause 12, wherein the apparatus caused to determine the quality of the composite assembly includes the apparatus caused to determine the ratio is above a threshold ratio that indicates a threshold quality of the composite assembly, and wherein the indication of the quality of the composite assembly that is output includes an alert that indicates the quality is below the threshold quality.

Clause 14. The apparatus of any of clauses 1 to 13, wherein the subset of the intensity values that is identified describes the distribution of resin on the core that is a non-metallic honeycomb core.

Clause 15. The apparatus of clause 14, wherein the composite assembly includes the non-metallic honeycomb core adhered to two skins in a sandwich-structured composite assembly, and the image that is accessed is of the cross section of the non-metallic honeycomb core taken perpendicular to the two skins.

Clause 16. A method of inspecting a composite assembly that includes a core coated with resin, the method comprising: accessing an image of a cross section of the core, the image having a dot matrix data structure with a matrix of intensity values; identifying a subset of the intensity values that describe a distribution of the resin on the core; classifying the intensity values of the subset of the intensity values as uniform to indicate a uniform distribution of the resin on the core, or non-uniform to indicate a non-uniform distribution of the resin on the core; performing a first comparison of a number of the intensity values classified as uniform and a total number of the intensity values of the subset, or a second comparison of the number of the intensity values classified as non-uniform and the total number of the intensity values of the subset; determining a quality of the composite assembly based on the first comparison or the second comparison as performed; and outputting an indication of the quality of the composite assembly.

Clause 17. The method of clause 16, wherein the image that is accessed is a grayscale image of the cross section of the core.

Clause 18. The method of clause 16 or clause 17, wherein the first comparison is performed, and performing the first comparison includes determining a ratio of the number of intensity values classified as uniform to the total number of the intensity values of the subset, and wherein the quality of the composite assembly is determined based on the ratio.

Clause 19. The method of clause 18, wherein determining the quality of the composite assembly includes determining the ratio is below a threshold ratio that indicates a threshold quality of the composite assembly, and wherein the indication of the quality of the composite assembly that is output includes an alert that indicates the quality is below the threshold quality.

Clause 20. The method of any of clauses 16 to 19, wherein the second comparison is performed, and performing the second comparison includes determining a ratio of the number of intensity values classified as non-uniform to the total number of the intensity values of the subset, and wherein the quality of the composite assembly is determined based on the ratio.

Clause 21. The method of clause 20, wherein determining the quality of the composite assembly includes determining the ratio is above a threshold ratio that indicates a threshold quality of the composite assembly, and wherein the indication of the quality of the composite assembly that is output includes an alert that indicates the quality is below the threshold quality.

Clause 22. The method of any of clauses 16 to 21, wherein the intensity values of the subset that is identified are those of the intensity values of the matrix of intensity values within a first predetermined range of intensity values that indicates resin on the core.

Clause 23. The method of clause 22, wherein the first comparison is performed, and those of the intensity values classified as uniform are within a second predetermined range of intensity values that is within the first predetermined range and that indicates uniform distribution of resin.

Clause 24. The method of clause 23, wherein performing the first comparison includes determining a ratio of a number of intensity values within the second predetermined range to a number of intensity values within the first predetermined range, and wherein the quality of the composite assembly is determined based on the ratio.

Clause 25. The method of clause 24, wherein determining the quality of the composite assembly includes determining the ratio is below a threshold ratio that indicates a threshold quality of the composite assembly, and wherein the indication of the quality of composite assembly that is output includes an alert that indicates the quality is below the threshold quality.

Clause 26. The method of any of clauses 22 to 25, wherein the second comparison is performed, and those of the intensity values classified as non-uniform are within the first predetermined range but outside a second predetermined range of intensity values that is within the first predetermined range and that indicates uniform distribution of resin.

Clause 27. The method of clause 26, wherein performing the second comparison includes determining a ratio of a number of intensity values within the first predetermined range but outside the second predetermined range, to a number of intensity values within the first predetermined range.

Clause 28. The method of clause 27, wherein determining the quality of the composite assembly includes determining the ratio is above a threshold ratio that indicates a threshold quality of the composite assembly, and wherein the indication of the quality of the composite assembly that is output includes an alert that indicates the quality is below the threshold quality.

Clause 29. The method of any of clauses 16 to 28, wherein the subset of the intensity values that is identified describes the distribution of resin on the core that is a non-metallic honeycomb core.

Clause 30. The method of clause 29, wherein the composite assembly includes the non-metallic honeycomb core adhered to two skins in a sandwich-structured composite assembly, and the image that is accessed is of the cross section of the non-metallic honeycomb core taken perpendicular to the two skins.

Clause 31. A computer-readable storage medium for inspecting a composite assembly that includes a core coated with resin, the computer-readable storage medium being non-transitory and having computer-readable program code stored therein that, in response to execution by processing circuitry, causes an apparatus to at least: access an image of a cross section of the core, the image having a dot matrix data structure with a matrix of intensity values; identify a subset of the intensity values that describe a distribution of the resin on the core; classify the intensity values of the subset of the intensity values as uniform to indicate a uniform distribution of the resin on the core, or non-uniform to indicate a non-uniform distribution of the resin on the core; perform a first comparison of a number of the intensity values classified as uniform and a total number of the intensity values of the subset, or a second comparison of the number of the intensity values classified as non-uniform and the total number of the intensity values of the subset; determine a quality of the composite assembly based on the first comparison or the second comparison as performed; and output an indication of the quality of the composite assembly.

Clause 32. The computer-readable storage medium of clause 31; wherein the image that is accessed is a gray scale image of the cross section of the core.

Clause 33. The computer-readable storage medium of clause 31 or clause 32, wherein the first comparison is performed, and the apparatus caused to perform the first comparison includes the apparatus caused to determine a ratio of the number of intensity values classified as uniform to the total number of the intensity values of the subset, and wherein the quality of the composite assembly is determined based on the ratio.

Clause 34. The computer-readable storage medium of clause 33, wherein the apparatus caused to determine the quality of the composite assembly includes the apparatus caused to determine the ratio is below a threshold ratio that indicates a threshold quality of the composite assembly, and wherein the indication of the quality of the composite assembly that is output includes an alert that indicates the quality is below the threshold quality.

Clause 35. The computer-readable storage medium of any of clauses 31 to 34; wherein the second comparison is performed, and the apparatus caused to perform the second comparison includes the apparatus caused to determine a ratio of the number of intensity values classified as non-uniform to the total number of the intensity values of the subset, and wherein the quality of the composite assembly is determined based on the ratio.

Clause 36. The computer-readable storage medium of clause 35, wherein the apparatus caused to determine the quality of the composite assembly includes the apparatus caused to determine the ratio is above a threshold ratio that indicates a threshold quality of the composite assembly, and wherein the indication of the quality of the composite assembly that is output includes an alert that indicates the quality is below the threshold quality.

Clause 37. The computer-readable storage medium of any of clauses 31 to 36, wherein the intensity values of the subset that is identified are those of the intensity values of the matrix of intensity values within a first predetermined range of intensity values that indicates resin on the core.

Clause 38. The computer-readable storage medium of clause 37, wherein the first comparison is performed, and those of the intensity values classified as uniform are within a second predetermined range of intensity values that is within the first predetermined range and that indicates uniform distribution of resin.

Clause 39. The computer-readable storage medium of clause 38, wherein the apparatus caused to perform the first comparison includes the apparatus caused to determine a ratio of a number of intensity values within the second predetermined range to a number of intensity values within the first predetermined range, and wherein the quality of the composite assembly is determined based on the ratio.

Clause 40. The computer-readable storage medium of clause 39, wherein the apparatus caused to determine the quality of the composite assembly includes the apparatus caused to determine the ratio is below a threshold ratio that indicates a threshold quality of the composite assembly, and wherein the indication of the quality of composite assembly that is output includes an alert that indicates the quality is below the threshold quality.

Clause 41. The computer-readable storage medium of any of clauses 37 to 40, wherein the second comparison is performed, and those of the intensity values classified as non-uniform are within the first predetermined range but outside a second predetermined range of intensity values that is within the first predetermined range and that indicates uniform distribution of resin.

Clause 42. The computer-readable storage medium of clause 41, wherein the apparatus caused to perform the second comparison includes the apparatus caused to determine a ratio of a number of intensity values within the first predetermined range but outside the second predetermined range, to a number of intensity values within the first predetermined range.

Clause 43. The computer-readable storage medium of clause 42, wherein the apparatus caused to determine the quality of the composite assembly includes the apparatus caused to determine the ratio is above a threshold ratio that indicates a threshold quality of the composite assembly, and wherein the indication of the quality of the composite assembly that is output includes an alert that indicates the quality is below the threshold quality.

Clause 44. The computer-readable storage medium of any of clauses 31 to 43, wherein the subset of the intensity values that is identified describes the distribution of resin on the core that is a non-metallic honeycomb core.

Clause 45. The computer-readable storage medium of clause 44, wherein the composite assembly includes the non-metallic honeycomb core adhered to two skins in a sandwich-structured composite assembly, and the image that is accessed is of the cross section of the non-metallic honeycomb core taken perpendicular to the two skins.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for inspecting a composite assembly that includes a core coated with resin, the apparatus comprising:
   a memory configured to store computer-readable program code; and
   processing circuitry configured to access the memory, and execute the computer-readable program code to cause the apparatus to at least:
      access an image of a cross section of the core, the image having a dot matrix data structure with a matrix of intensity values;
      determine a range of the intensity values that is associated with a shadow;
      identify, based on determining a range of intensity values that is associated with the shadow, a subset of the intensity values that describe a distribution of the resin on the core;
      classify the intensity values of the subset of the intensity values as uniform to indicate a uniform distribution of the resin on the core, or non-uniform to indicate a non-uniform distribution of the resin on the core;
      perform a first comparison of a number of the intensity values classified as uniform and a total number of the intensity values of the subset, or a second comparison of the number of the intensity values classified as non-uniform and the total number of the intensity values of the subset;
      determine a quality of the composite assembly based on the first comparison or the second comparison as performed; and
      output an indication of the quality of the composite assembly.

2. The apparatus of claim 1, wherein the first comparison is performed, and the apparatus caused to perform the first comparison includes the apparatus caused to determine a ratio of the number of intensity values classified as uniform to the total number of the intensity values of the subset,
   wherein the quality of the composite assembly is determined based on the ratio,
   wherein the apparatus caused to determine the quality of the composite assembly includes the apparatus caused to determine the ratio is below a threshold ratio that indicates a threshold quality of the composite assembly, and
   wherein the indication of the quality of the composite assembly that is output includes an alert that indicates the quality is below the threshold quality.

3. The apparatus of claim 1, wherein the second comparison is performed, and the apparatus caused to perform the second comparison includes the apparatus caused to determine a ratio of the number of intensity values classified as non-uniform to the total number of the intensity values of the subset,
   wherein the quality of the composite assembly is determined based on the ratio,
   wherein the apparatus caused to determine the quality of the composite assembly includes the apparatus caused to determine the ratio is above a threshold ratio that indicates a threshold quality of the composite assembly, and
   wherein the indication of the quality of the composite assembly that is output includes an alert that indicates the quality is below the threshold quality.

4. The apparatus of claim 1, wherein the intensity values of the subset that is identified are those of the intensity values of the matrix of intensity values within a first predetermined range of intensity values that indicates resin on the core.

5. The apparatus of claim 4, wherein the first comparison is performed, and those of the intensity values classified as uniform are within a second predetermined range of intensity values that is within the first predetermined range and that indicates uniform distribution of resin.

6. The apparatus of claim 5, wherein the apparatus caused to perform the first comparison includes the apparatus caused to determine a ratio of a number of intensity values within the second predetermined range to a number of intensity values within the first predetermined range, and
   wherein the quality of the composite assembly is determined based on the ratio.

7. The apparatus of claim 6, wherein the apparatus caused to determine the quality of the composite assembly includes the apparatus caused to determine the ratio is below a threshold ratio that indicates a threshold quality of the composite assembly, and
   wherein the indication of the quality of composite assembly that is output includes an alert that indicates the quality is below the threshold quality.

8. The apparatus of claim 4, wherein the second comparison is performed, and those of the intensity values classified as non-uniform are within the first predetermined range but outside a second predetermined range of intensity values that is within the first predetermined range and that indicates uniform distribution of resin.

9. The apparatus of claim 8, wherein the apparatus caused to perform the second comparison includes the apparatus caused to determine a ratio of a number of intensity values within the first predetermined range but outside the second predetermined range, to a number of intensity values within the first predetermined range,
   wherein the apparatus caused to determine the quality of the composite assembly includes the apparatus caused to determine the ratio is above a threshold ratio that indicates a threshold quality of the composite assembly, and wherein the indication of the quality of the composite assembly that is output includes an alert that indicates the quality is below the threshold quality.

10. The apparatus of claim 1, wherein the subset of the intensity values that is identified describes the distribution of resin on the core that is a non-metallic honeycomb core, and wherein the composite assembly includes the non-metallic honeycomb core adhered to two skins in a sandwich-structured composite assembly, and the image that is accessed is of the cross section of the non-metallic honeycomb core taken perpendicular to the two skins.

11. A method of inspecting a composite assembly that includes a core coated with resin, the method comprising:

accessing an image of a cross section of the core, the image having a dot matrix data structure with a matrix of intensity values;

determining a range of the intensity values that is associated with a shadow;

identifying, based on determining a range of intensity values that is associated with the shadow, a subset of the intensity values that describe a distribution of the resin on the core;

classifying the intensity values of the subset of the intensity values as uniform to indicate a uniform distribution of the resin on the core, or non-uniform to indicate a non-uniform distribution of the resin on the core;

performing a first comparison of a number of the intensity values classified as uniform and a total number of the intensity values of the subset, or a second comparison of the number of the intensity values classified as non-uniform and the total number of the intensity values of the subset;

determining a quality of the composite assembly based on the first comparison or the second comparison as performed; and outputting an indication of the quality of the composite assembly.

12. The method of claim 11, wherein the first comparison is performed, and performing the first comparison includes determining a ratio of the number of intensity values classified as uniform to the total number of the intensity values of the subset, wherein the quality of the composite assembly is determined based on the ratio, wherein determining the quality of the composite assembly includes determining the ratio is below a threshold ratio that indicates a threshold quality of the composite assembly, and wherein the indication of the quality of the composite assembly that is output includes an alert that indicates the quality is below the threshold quality.

13. The method of claim 11, wherein the second comparison is performed, and performing the second comparison includes determining a ratio of the number of intensity values classified as non-uniform to the total number of the intensity values of the subset, wherein the quality of the composite assembly is determined based on the ratio, wherein determining the quality of the composite assembly includes determining the ratio is above a threshold ratio that indicates a threshold quality of the composite assembly, and wherein the indication of the quality of the composite assembly that is output includes an alert that indicates the quality is below the threshold quality.

14. The method of claim 11, wherein the intensity values of the subset that is identified are those of the intensity values of the matrix of intensity values within a first predetermined range of intensity values that indicates resin on the core.

15. The method of claim 14, wherein the first comparison is performed, and those of the intensity values classified as uniform are within a second predetermined range of intensity values that is within the first predetermined range and that indicates uniform distribution of resin.

16. The method of claim 15, wherein performing the first comparison includes determining a ratio of a number of intensity values within the second predetermined range to a number of intensity values within the first predetermined range, and wherein the quality of the composite assembly is determined based on the ratio.

17. The method of claim 16, wherein determining the quality of the composite assembly includes determining the ratio is below a threshold ratio that indicates a threshold quality of the composite assembly, and wherein the indication of the quality of composite assembly that is output includes an alert that indicates the quality is below the threshold quality.

18. The method of claim 14, wherein the second comparison is performed, and those of the intensity values classified as non-uniform are within the first predetermined range but outside a second predetermined range of intensity values that is within the first predetermined range and that indicates uniform distribution of resin, wherein performing the second comparison includes determining a ratio of a number of intensity values within the first predetermined range but outside the second predetermined range, to a number of intensity values within the first predetermined range, wherein determining the quality of the composite assembly includes determining the ratio is above a threshold ratio that indicates a threshold quality of the composite assembly, and wherein the indication of the quality of the composite assembly that is output includes an alert that indicates the quality is below the threshold quality.

19. The method of claim 11, wherein the subset of the intensity values that is identified describes the distribution of resin on the core that is a non-metallic honeycomb core, and wherein the composite assembly includes the non-metallic honeycomb core adhered to two skins in a sandwich-structured composite assembly, and the image that is accessed is of the cross section of the non-metallic honeycomb core taken perpendicular to the two skins.

20. A computer-readable storage medium for inspecting a composite assembly that includes a core coated with resin, the computer-readable storage medium being non-transitory and having computer-readable program code stored therein that, in response to execution by processing circuitry, causes an apparatus to at least:

access an image of a cross section of the core, the image having a dot matrix data structure with a matrix of intensity values;

determine a range of the intensity values that is associated with a shadow;

identify, based on determining a range of intensity values that is associated with the shadow, a subset of the intensity values that describe a distribution of the resin on the core;

classify the intensity values of the subset of the intensity values as uniform to indicate a uniform distribution of the resin on the core, or non-uniform to indicate a non-uniform distribution of the resin on the core;

perform a first comparison of a number of the intensity values classified as uniform and a total number of the intensity values of the subset, or a second comparison of the number of the intensity values classified as non-uniform and the total number of the intensity values of the subset;

determine a quality of the composite assembly based on the first comparison or the second comparison as performed; and output an indication of the quality of the composite assembly.

* * * * *